Nov. 23, 1965 D. O. LEIBY ETAL 3,218,960
COOKING APPARATUS
Filed Aug. 28, 1961 3 Sheets-Sheet 3

INVENTORS
DAYTON O. LEIBY
FRANK DOUGLAS BARKALOW
BY
William R. Liberman
ATTORNEY

United States Patent Office 3,218,960
Patented Nov. 23, 1965

3,218,960
COOKING APPARATUS
Dayton O. Leiby, Alhambra, Calif., and Frank Douglas Barkalow, Stamford Conn., assignors to DCA Food Industries, Inc., New York, N.Y., a corporation of New York
Filed Aug. 28, 1961, Ser. No. 134,496
3 Claims. (Cl. 99—354)

The present invention relates generally to improvements in apparatus for the production of comestibles, and in particular it relates to an improved apparatus for the production of fried cakes such as doughnuts or the like.

Fried cakes such as doughnuts are produced commercially on a large scale with highly automatic equipment, domestically substantially by hand, or semi-commercially on a small scale for sale and distribution at a single store or restaurant. It is with this latter type of operation that the present invention is primarily concerned. The equipment heretofore available for the small scale production of fried cakes is either of a highly complex and expensive nature, difficult to clean, service and maintain, or of a relatively primitive nature, of little versatility and limited capacity, requiring considerable personal attendance and otherwise leaving such to be desired. In the copending patent application of Dayton O. Leiby, Serial No. 825,283, filed July 6, 1959, now U.S. Patent No. 3,085,499, there is described a small capacity doughnut frying and icing apparatus which overcomes many of the drawbacks of the earlier equipment. However, the aforesaid apparatus possesses a number of disadvantages which greatly limit its commercial use. It is of limited application, is lacking in versatility and flexibility and is awkward and difficult to maintain, clean and service.

It is, therefore, a principal object of the present invention to provide an improved apparatus for the production of fried cakes, such as doughnuts or the like comestibles.

Another object of the present invention is to provide an improved apparatus for the production of yeast-raised and chemical leavening raised doughnuts.

A further object of the present invention is to provide a doughnut frying and glazing apparaus which is easily assembled and disassembled for cleaning, maintenance and servicing purposes.

Still another object of the present invention is to provide a doughnut producing apparatus of the above nature characterized by its ruggedness, simplicity, versatility, compactness, ease of operation, and low cost.

The above and further objects of the present invention will become apparent from a reading of the following description taken in conjunction with the accompanying drawings wherein.

Figure 1:
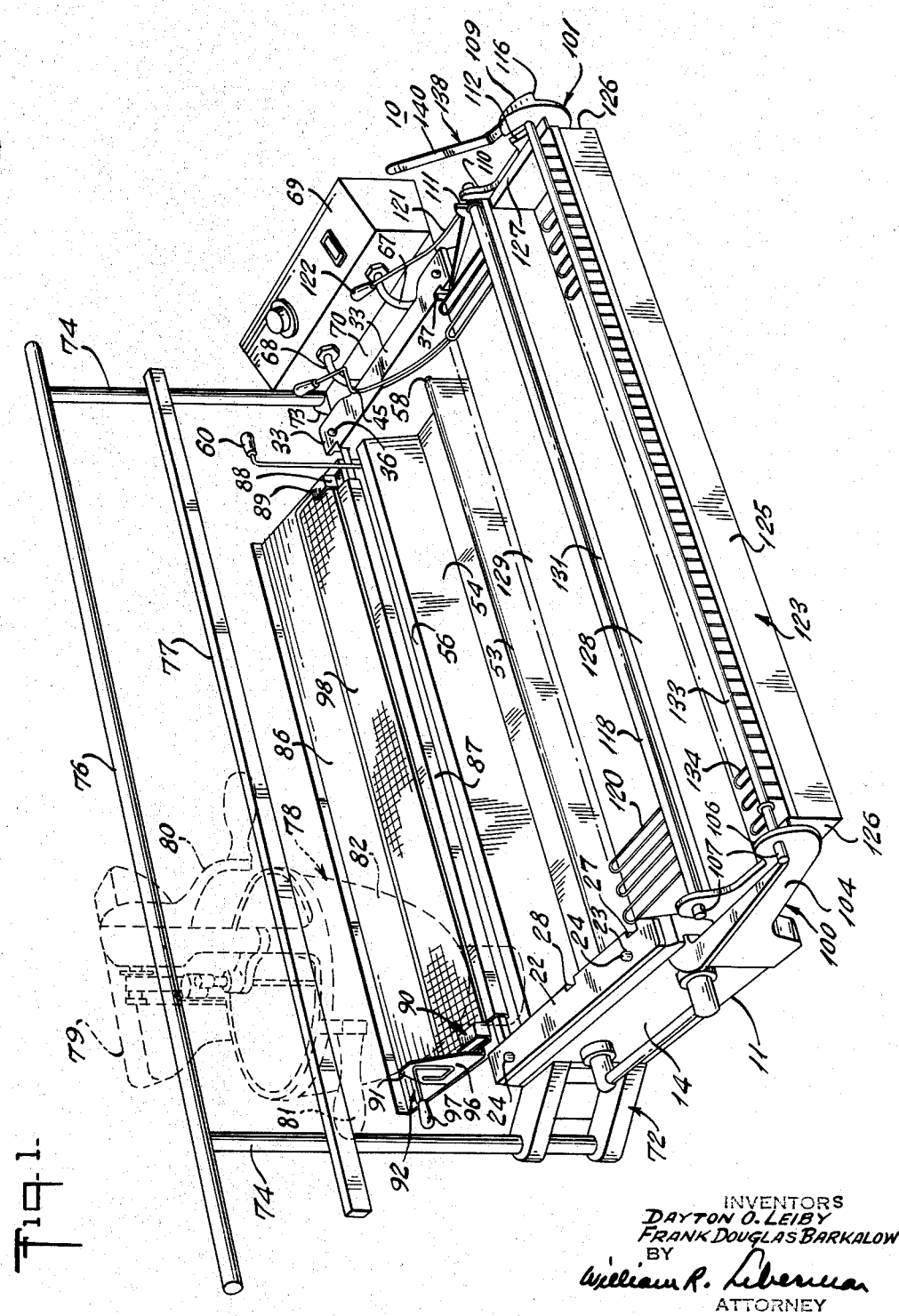
FIGURE 1 is a front perspective view of an apparatus embodying the present invention, the doughnut forming device being illustrated by a broken line.
Figure 2:
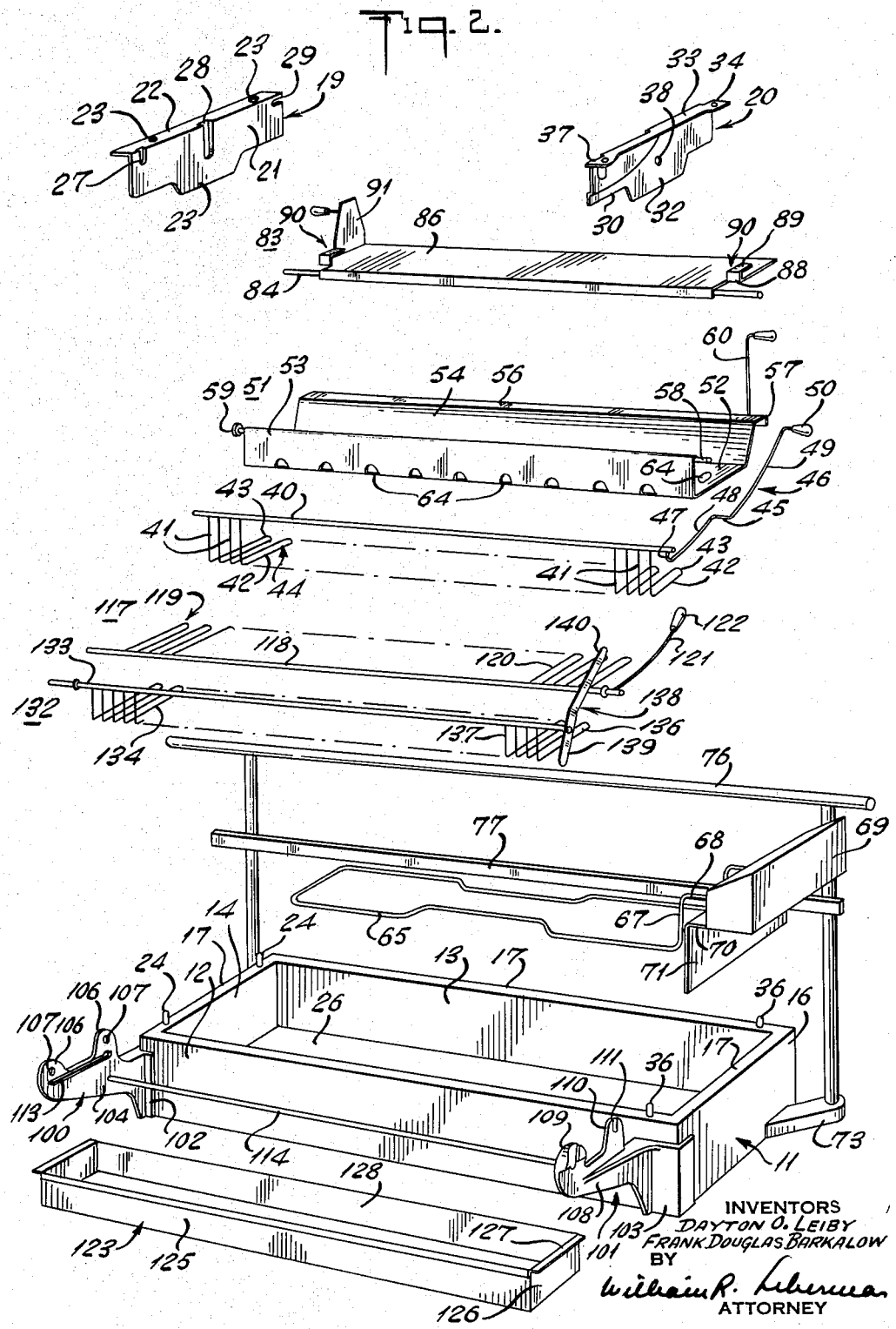
FIGURE 2 is an exploded perspective view thereof.

An important feature of the present cooking apparatus is the construction which permits the rapid disassembly and reassembly thereof for cleaning and maintenance purposes. This is achieved by providing a cooking apparatus comprising an open topped vessel for holding a cooking liquid and including transversely extending front and rear walls, a first transversely extending tray member, normally disposed in said vessel adjacent said front wall, means separably swingably supporting said first tray member about a transverse axis above the front edge thereof for movement to an inverted position above and forward of the upper edge of said front wall, a first handle member connecting to said first tray member, a second transversely extending tray member normally disposed in said vessel behind said first tray member, means separably swingably supporting said second tray member about a transverse axis above the front edge thereof for movement to an inverted position above said first tray member, a second handle member connected to said second tray member, bracket means disposed adjacent the upper edge of said rear wall and swingable about a transverse axis adjacent to said rear wall upper edge, and a third tray releasably engaged by said bracket means and swingable therewith. A heating system is likewise separably mounted in the vessel and includes a heating element extending along and adjacent the bottom of the vessel and terminating in a pair of legs projecting upwardly along the vessel end wall and communicating with a control box also separably supported by the vessel.

Another feature of the present apparatus is its versatility in that it is capable of readily producing yeast-raised or proofed doughnuts as well as chemical leavening raised doughnuts. To this end there is provided a transversely extending track located above the rear section of the cooking vessel. A dough forming device is slidable along the track and is provided with an extrusion opening directed downwardly toward the second tray member.

Still another important feature of the present apparatus is the post cooking cake handling and glazing arrangements. This includes a fourth transversely extending tray member disposed above and forward of the vessel front wall and swingable about a transverse axis adjacent its front edge, and a fifth transversely extending tray member disposed forward of said fourth tray member and swingable about a transverse axis disposed above the front edge thereof. A tank or receptacle adapted to hold a liquid glaze is located in registry with the fifth tray member which is swingable into and out of the receptacle. Means are provided for releasably latching the fifth tray member in an inclined position overlying the glaze receptacle.

Referring now to the drawings which illustrate a preferred embodiment of the present invention, reference numeral 10 generally designates the improved apparatus which is employed in the frying and glazing of yeast raised or leavening raised doughnuts and includes an open-topped main cooking vessel or tank 11 of substantially rectangular configuration. Tank 11 comprises an inner shell and a spaced outer shell which are separated by suitable thermal insulation material and is delineated by front and rear walls 12 and 13 respectively, opposite side walls 14 and 16 and a base 26. The correspondingly upper edges of the inner and outer shells are connected by a substantially flat peripheral rectangular rim 17. Depending from the under side of the tank 11 are a plurality of supporting foot pieces 18.

A pair of journal brackets 19 and 20 are releasably supported in tank 11 adjacent side walls 14 and 16. Bracket 19 includes a vertical plate 21 about the length of tank side wall 14 and is provided at its upper edge with an outwardly directed flange 22 and its lower edge with a depending section 23. Formed in each flange 22 are a pair of spaced apertures 23a which slidably register with correspondingly spaced pins 24 extending upwardly from rim 17 along side walls 14 and 16. Flange 22 rests on rim 17 and plate 21 extends along the inner face of side wall 14, lower section 23 reaching to tank base 26. A relatively short vertical groove 27 is formed in the inner face of plate 21 adjacent its forward edge which groove extends upwardly through flange 22 and terminates at its lower end in an arcuate cradle located a short distance below flange 22. A relatively long vertical groove 28 is formed in plate 21 substantially intermediate its ends which also extend upwardly through flange 22 and terminates at its lowermost point in an arcuate cradle located some distance below the lower end of groove 27. Also formed in the inner face of plate 21, directly below flange 22, is a short horizontal groove 29 which extends to the rear edge of plate 21.

Journal bracket 20 includes a vertical plate 30 having a depending tongue section 32 and provided along its upper edge with an outwardly projecting flange 33. Projecting forwardly and rearwardly of flange 33 are tab members 34 having openings formed therein which slidably register with a pair of pins 36 directed upwardly from rim 17 along front and rear walls 12 and 13 and spaced inwardly from side wall 16. Plate 30 depends from flange 33 substantially to tank floor 26, is spaced from side wall 16, and extends substantially to front and rear walls 12 and 13. Formed in the inner face of plate 30, adjacent its leading edge, is a vertical groove 37 extending from the top face of flange 33 and terminating at its bottom in a cradle at the level of and in transverse alignment with the bottom of groove 27. Also formed in plate 30 at the level of and in transverse alignment with the bottom cradle end of groove 28 is a circular opening 38. A horizontal groove, the aligned counterpart of groove 29, is formed in the upper trailing corner of plate 30.

A first tray member 39 is normally disposed in the forward section of tank 11 and is journalled to and between brackets 19 and 20 for swinging movement about a transverse axis adjacent the upper forward edge of the tank. Tray 39 includes a shaft-defining rod 40 whose ends register with and rest in the cradle-defining ends of grooves 27 and 34. A plurality of transversely spaced pairs of transversely spaced legs 41 depend from the rod 40 and have their upper ends welded to rod 40 and terminate at their lower ends in rearwardly directed arms 42. Said arms 42 are joined at their ends by bridge portions 43 which form, with arms 42, a plurality of wire U-shaped coplanar members defining a tray 44. A first wire handle member 46 has an end leg 47 affixed to and depending from rod 40 adjacent plate 30 and joins a rearwardly upwardly inclined arm including an inner section 48 and a transversely offset outer section 49 which is connected to section 48 by a cross-arm 45 and terminates in a hand piece 50. Tray 39 may be selectively swung about the axis of rod 40 between its retracted position in tank 11 and an advanced inverted position above and extending forward of the upper edge of the tank front wall 12 merely by manipulating handle 46. Moreover, tray 39 may be separated from the apparatus simply by lifting rod 40 out of engagement with the grooves 27 and 34.

A second tray member 51 is normally disposed in the rear section of the tank 11 and is swingable about a transverse axis above its leading forward edge to a position overlying the front tray 39. Second tray 51 is formed of sheet metal, and includes a base section 52 provided along its leading edge with an upstanding vertical panel 53 and along its rear edge with a rearwardly upwardly inclined panel 54 terminating in a rearwardly directed flange 56 having a depending lip 57. Affixed to the upper border of front panel 53 is a transversely extending shaft-defining rod 58 terminating at one end in an enlarged circular head 59 resting in the cradle end of bracket groove 28 and having its other end registering with bracket aperture 38. An upwardly directed wire handle 60 is pivoted at its lower end to a bracket 61 projecting rearwardly from the lower section of panel 54 adjacent its side end. Tray 51 is moveable to its inverted position by raising and manipulating handle 60 and is readily separable from tank 11 by raising shaft 58 out of engagement with groove 28 and then slipping it from the aperture 38. It should be noted that the bases of tray members 39 and 51, when in their retracted positions, are at substantially the same level above tank floor 26. Base section 52 is limited to movement to its retracted position by a leg 63 depending from panel 54 and engaging floor 26 when tray 51 is in its retracted position. The base of tray 39 is limited to movement to its aforesaid retracted position by handle cross arm 45 coming into engagement with bracket flange 33 when tray 39 is in retracted position. In order to facilitate the circulating of the cooking fluid through tray 51 a plurality of openings 64 are formed in base section 52 and front panel 63.

The liquid heating system comprises a metal tube sheathed electric resistance heater element 65 shaped in the form of a pinched elongated loop extending along and mounted above tank floor 26 by depending bracket members 66 carried by element 65. Said heater element 65 terminates in a pair of vertical legs 67 having transverse arms 68 projecting into a metal control box 69 which houses a conventional electrical adjustable heat regulating system responding to a heat sensitive element disposed in tank 11. Control box 69 is mounted atop a panel 70 resting on rim 17 of tank side wall 16 and is provided with a vertical plate 71 depending from the inner edge of panel 70 along the inner face of side wall 16 to tank floor 26. Heater element legs 67 are disposed between the plates 71 and 30 and the heater element adjacent legs 67 straddle bracket tongue 32 and extend below the bottom side edges of plate 30. The heater and control box assembly are easily separable from tank 11 following the removal of tray members 39 and 51 and brackets 19 and 20.

A bracket member 72 includes a pair of vertically spaced horizontal arms projecting rearwardly and outwardly from the rear outer face of side wall 14, and a bracket arm 73 projects rearwardly outwardly from the lower rear corner of the outer face of side wall 16. Upright parallel posts 74 register with openings in and are supported by brackets 72 and 73 and are disposed rearwardly of tank rear wall 13. Mounted atop posts 74 is a transversely extending track 76 of circular transverse cross section. A transversely extending horizontal guide bar 77 is mounted on the front faces of posts 74 below track 76. A doughnut ring forming and cutting device 78, of well known construction, is supported by a carriage 79 which is provided with wheels in its upper section engaging track 76 along which carriage 79 rides. The guide bar 77 maintains the carriage in an upright oriented position in well known manner. The dough ring forming device includes a depending nozzle having a discharge opening disposed immediately above tank 11 and directed vertically downwardly toward tray base 52. A handle 80 actuates the dough forming mechanism, and a handle 81 connected to the forming device dough hopper 82 facilitates the sliding of the dough foming device 78 and carriage 79 transversely across tank 11 attendant to the forming of dough rings and the dropping thereof into the tank in properly spaced relationship.

In order to facilitate the use of the present apparatus with proofed or yeast raised cakes there is provided a bracket assembly 83 projecting rearwardly from and separably pivotally supported about a transverse axis shortly forward and below the upper rear edge of tank 11. Bracket assembly 83 includes a transversely extending shaft defining rod 84, the ends of which separably register with bracket slot 29 and the corresponding slot formed in bracket 20. Affixed to rod 84 and projecting rearwardly therefrom is a rectangular panel 86 having a depending flange 87 terminating in a rearwardly directed lip and welded to rod 84. When bracket assembly 83 is in its retracted position, panel 86 rests on rim 17 and projects rearwardly slightly upwardly from rod 84. The front side borders of panel 86 are cut and shaped to provide a pair of opposite upright legs 88 terminating in rearwardly directed arms 89 which, with the confronting borders of panel 86, define tray-engaging brackets 90. A wall 91 projects upwardly from a rear side edge of panel 86 and a handle member 92 is attached thereto. Handle member 92 includes a U-shaped member provided with a short leg 94 terminating in a transverse pin engaging wall 91 and a long leg 96 carrying a hand piece 97. Rectangular proofing third trays 98 of conventional construction including a rod frame supporting a wire grid web are used with the apparatus and are selectively successively loaded on panel 86 with the loading border thereof separably engaged by brackets 89. By lifting handle 92, third tray 98 is tilted by the correspondingly tilted panel 86 to discharge cakes carried by tray 98 into tank 17 along tray 51. When the apparatus is employed with the dough forming device 78 the bracket assembly 83 may be removed from the apparatus.

A pair of transversely spaced bracket members 100 and 101 project forwardly from opposite sides of the tank front wall 12 each including a vertical angle member 102 and 103 respectively engaging and secured to a corresponding corner of tank 11. A bracket arm 104 is directed forwardly of angle member 102 substantially coplanar with tank side wall 14 and is provided along its upper edge with a pair of longitudinally spaced front and rear upright ears 106 which have circular apertures 107 formed therein at a level shortly above the top of tank 11. A gusset reinforced bracket arm 108 is directed forwardly from the inner edge of the front leg of angle member 103 and is provided along its upper edge with front and rear upright ears 109 and 110 respectively. Ear 110 has a vertical slot 111 formed therein, the arcuate base of which is in transverse alignment with rear ear aperture 107, and ear 109 has formed therein a forwardly downwardly inclined slot 112 terminating in an arcuate base in transverse alignment with front ear aperture 107. A pair of opposite coplanar horizontal ledges 113 is formed in the confronting faces of arms 104 and 108 directly below the upper edges thereof. Bracket arms 104 and 108 are connected by a tie rod 114. A radial shoulder 116 is formed in the outer face of ear 109 and is provided with a circumferential cam surface which extends from the face of ear 109 to the edge of shoulder 116.

A fourth tray member 117 is journalled to and between ear 110 and rear ear 106, and includes a transversely extending shaft-defining rod 118, the ends of which swingably register with ear slot 111 and rear ear 107 aperture 108. Tray base 119 is defined by a plurality of U-shaped coplanar wire members 120 directed rearwardly from rod 118 and having forwardly directed legs, the ends of which are affixed to rod 118. A wire handle member 121, terminating in a hand piece 122, is affixed to an outer end of rod 118 and is curved rearwardly and upwardly therefrom.

Supported between bracket arms 104 and 108 is a transversely extending, open topped glaze receptacle 123 of rectangular configuration including side walls 126 having outwardly directed flanges 127 along their upper edges which rest upon the bracket arm ledges 113. Rear wall 128 of receptacle 123 is in substantial vertical alignment with tray rod 111, and front wall 125 thereof is substantially in vertical alignment with the ear 109 and front ear 106.

A transversely extending pan 129 rests along its front on and extends for substantially the full length of the top edge of the glaze receptacle rear wall 128, and rests along its rear on the top of the tank front wall 12. The rear edge of pan 129 is provided with a depending skirt 130 which abuts the inner face of tank front wall 12 and the front and side walls thereof are provided with an upstanding peripheral flange 131. It should be noted that when tray member 117 is in its illustrated retracted position the rear border thereof rests on the section of pan 129 overlying tank rim 117.

A fifth tray member 132 is swingably supported about a transverse axis between brackets 100 and 101, and includes a transversely extending rod 133 the opposite ends of which register with the front ear aperture 107 and ear slot 112. Tray base 134 is defined by a plurality of transversely spaced rearwardly directed U-shaped coplanar wire members 136 having forwardly directed arms terminating in upright legs 137 the ends of which are affixed to rod 133. A radially extending handle member 138 is affixed to the free end of rod 133 adjacent ear 109 and includes a lower section 139 abutting the outer face of ear 109 and an upper outwardly inclined section 140. When tray 132 is in its retracted position, as illustrated, the base thereof is completely immersed in receptacle 123 adjacent the floor thereof. By swinging handle 138 forwardly, tray base 134 is swung to an upwardly rearwardly inclined intermediate position above the receptacle 123, in which position it can be releasably locked by bringing handle section 139 under the shoulder 116. The tray base may be completely inverted in a position forward of the receptacle 123 by further swinging of handle 138. As is obvious from the above, tray members 117 and 132 and pan 129 and receptacle 123 are readily separable from the apparatus.

Figure 3:
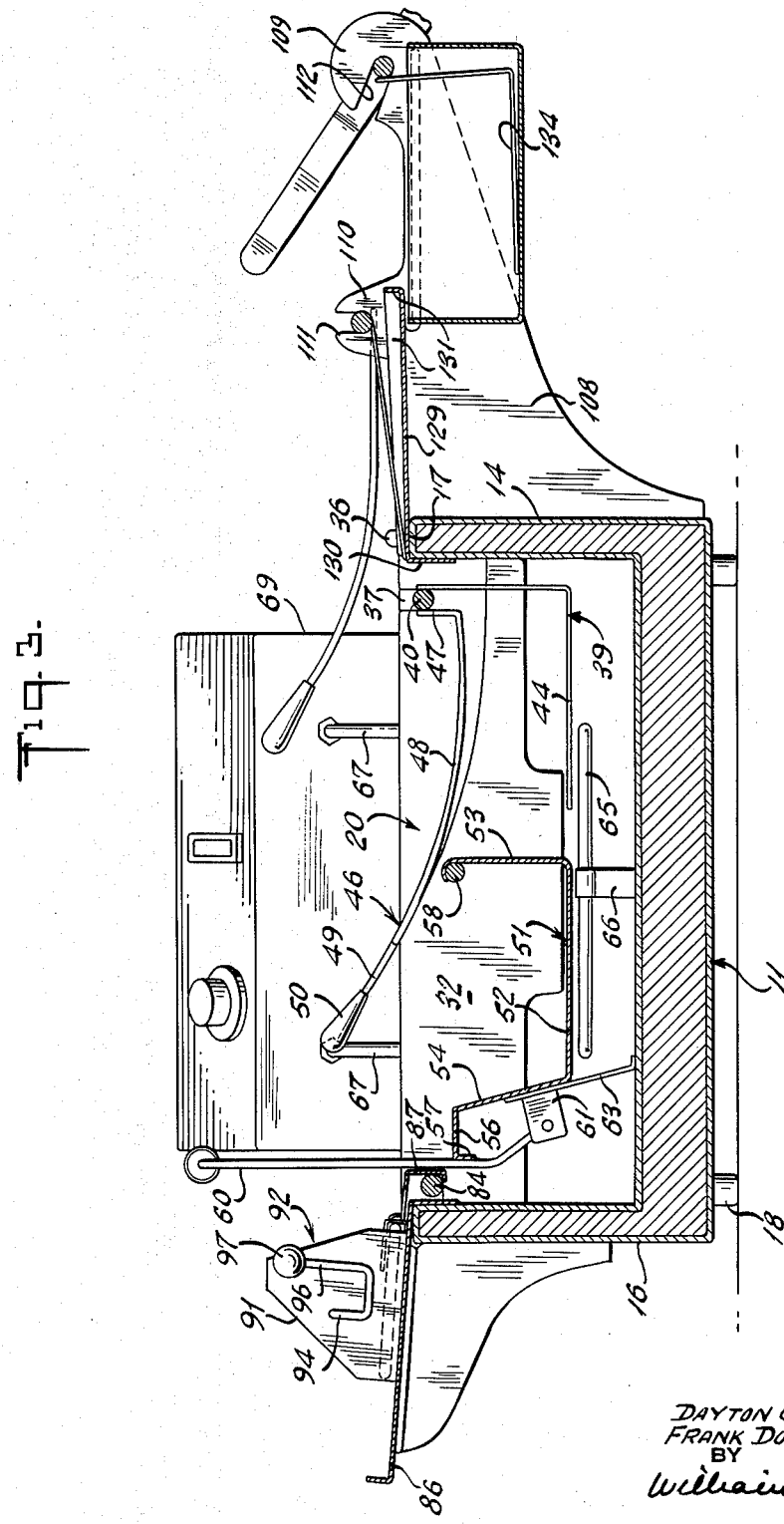
FIGURE 3 is a transverse cross sectional view thereof.

Considering now the operation of the apparatus described above in the production of yeast raised doughnuts, under normal operating conditions tank 11 contains a hot frying fat at a predetermined level and suitably heated by heating element 65 to the desired temperature, and the receptacle 123 contains a glazing material of conventional composition. The tray members are in their retracted positions, as illustrated in FIGURES 1 and 3, and rows of cakes are located upon or in registry with the trays 51, 39, 117 and 132. Tray 132 is raised and locked in its intermediate position to permit the draining of excess glaze into receptacle 123 and a discharge tray (not shown) is brought with its edge against the upper front edge of receptacle 123, and tray 132 is fully inverted over the discharge tray to deposit the glazed doughnuts thereon, after which tray 132 is returned to its original position. Tray 117 is then inverted by means of handle 121 to transfer the fat drained doughnuts therefrom into receptacle 123 over tray base 134, and is returned to its original position. Tray 39 is then inverted by means of handle 50 to lift the fried doughnuts from tank 11 and deposit them on tray 117 whereon the fat drains from the doughnuts and returns along pan 129 into tank 11, and tray 39 is then retracted to its original position.

Thereafter, tray member 51 is inverted by manipulation of handle 60 to turn the partially fried doughnuts and tranfer them into registry with tray 39, and tray 51 is then retracted. A tray 98 loaded with proofed doughnuts is placed in panel 86 in engagement with brackets 98 and is tilted therewith by means of handle 92 to dump the doughnuts into the rear section of tank 11 in registry with tray member 51. Bracket assembly 83 is then retracted, and empty tray 98 removed. The above cycle may be repeated as desired.

Where it is desired to produce cake or chemical leavening raised doughnuts, the above procedure is followed except that the dough is formed into rings by the device 78 and dropped directly into tank 11 in registry with tray 51. In the latter case, bracket assembly 83 may be removed as aforesaid.

While there has been described and illustrated a preferred embodiment of the present invention it is apparent that numerous alterations, omissions and additions may be made without departing from the spirit thereof.

We claim:

1. A cooking apparatus comprising an open topped vessel for holding a cooking liquid and including transversely extending front, rear and side walls, a pair of transversely spaced journal brackets separably mounted in said vessel adjacent said side walls, each bracket having a horizontally extending portion removably engaging the top of the vessel side wall and a vertically downwardly extending portion, a first transversely extending tray member normally disposed in said vessel adjacent said front wall and separably journalled to and between the vertical portions of said journal brackets at points above the leading edge of said first tray member and adjacent the front wall of the vessel for movement to an inverted position forward and above the upper edge of said front wall, means for selectively swinging said first tray member including a first handle member coupled to said first tray member, a second transversely extending tray member normally disposed in said vessel rearwardly of said first tray member and separably independently journalled to and between the vertical portions of said journal brackets at points above the leading edge of said second tray member and rearwardly of the journals supporting the first tray for movement to an inverted position above said first tray member, and means for selectively swinging said second tray member including a second handle coupled to said second tray member.

2. A cooking apparatus according to claim 1, wherein one of said journal brackets is spaced inwardly of the adjacent side wall, and comprising an electrical heating element located adjacent the floor of said vessel and including a pair of end legs directed upwardly between said spaced bracket and side wall, and a control box disposed outside said last side wall, said heating element legs being connected to said control box, said heating element and said control box being separable as a unit from said vessel.

3. A cooking apparatus according to claim 1, including a first pair of spaced pins directed upwardly from the top edge of one of said side walls, a second pair of pins directed upwardly from said front and rear walls adjacent the other of said side walls, the horizontal portions of said journal brackets having apertures formed therein slidably registering with said pins.

References Cited by the Examiner
UNITED STATES PATENTS

| | | | |
|---|---|---|---|
| 2,026,203 | 12/1935 | Ackles | 99—354 X |
| 2,067,849 | 1/1937 | Hunter | 99—354 X |
| 2,482,563 | 9/1949 | Spong | 99—354 X |
| 2,514,348 | 4/1950 | Meinerding | 99—409 |
| 2,537,204 | 1/1951 | Brickson | 99—409 |
| 2,614,485 | 10/1952 | Sinkwitz et al. | 99—409 X |
| 2,999,451 | 9/1961 | Buck et al. | 99—353 |
| 3,085,499 | 4/1963 | Leiby | 99—355 |

ROBERT E. PULFREY, *Primary Examiner.*
JEROME SCHNALL, LAWRENCE CHARLES,
*Examiners.*